Patented Nov. 8, 1927.

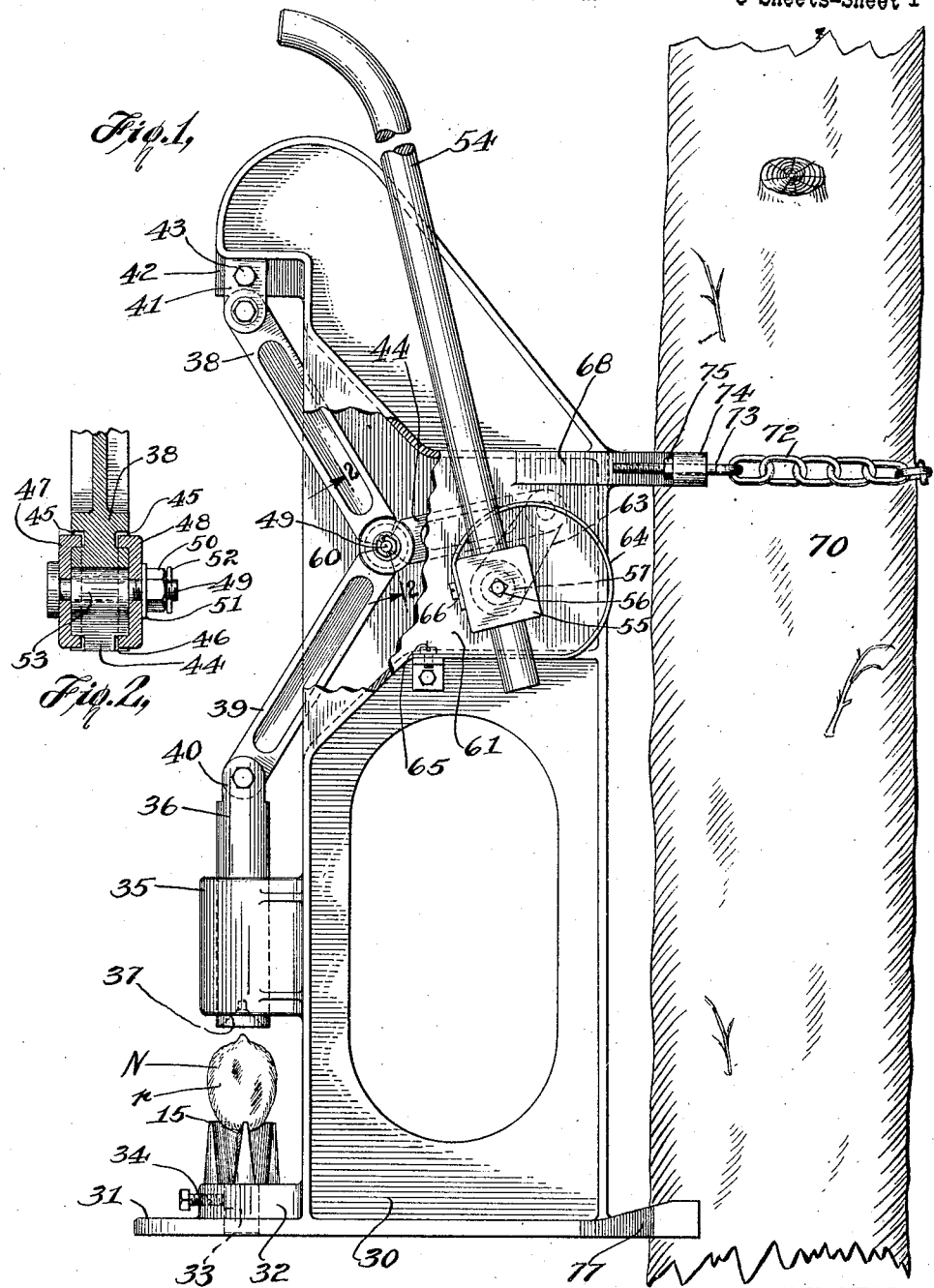

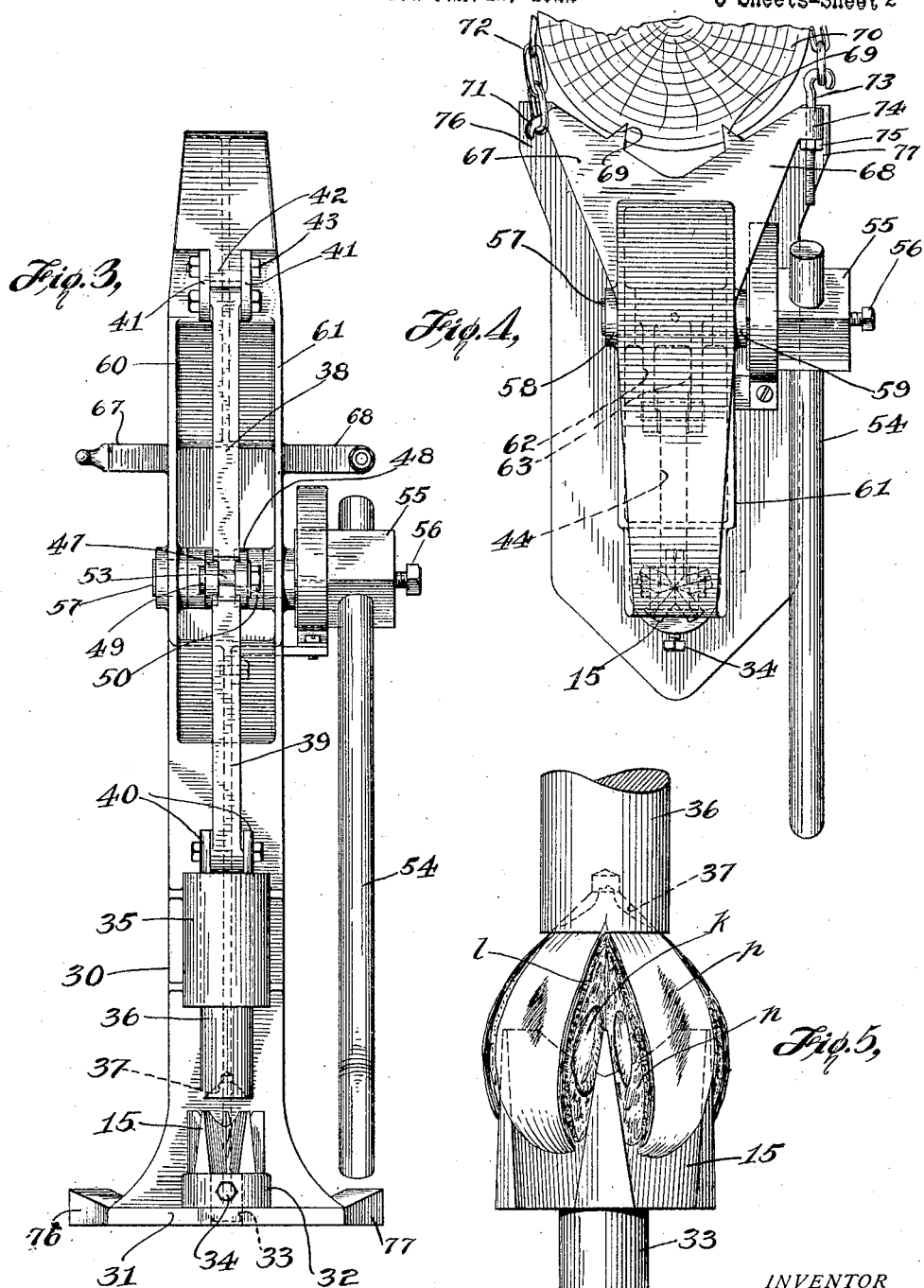

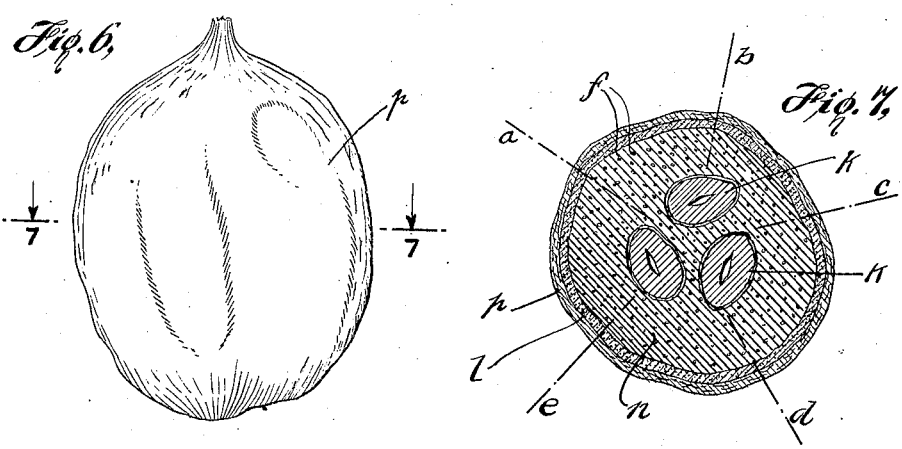
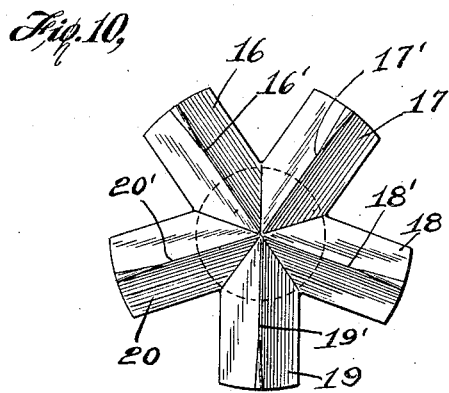
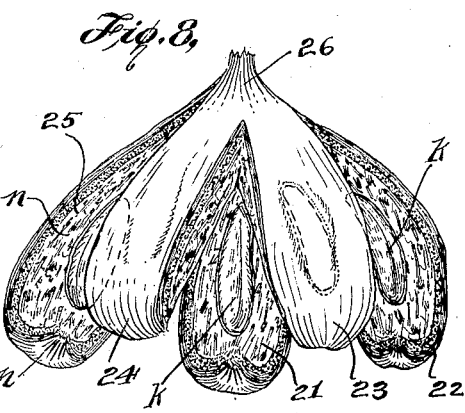
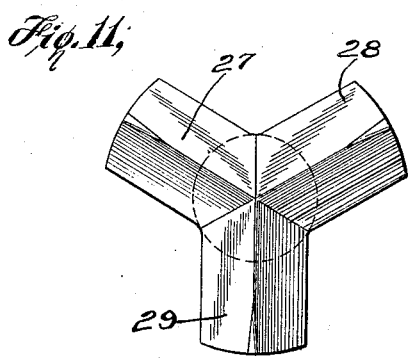
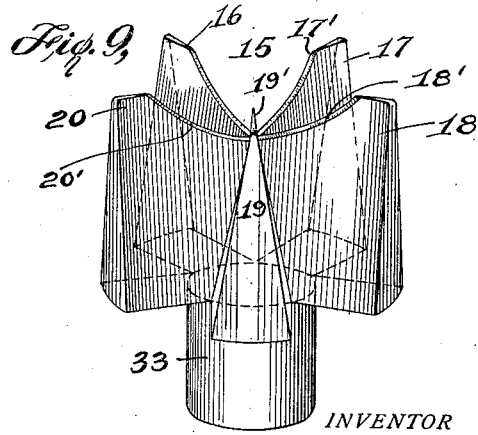

1,648,456

UNITED STATES PATENT OFFICE.

ROBERT B. JOHNSTON, OF COLLINGSWOOD, NEW JERSEY, ASSIGNOR TO CHARLES T. WILSON COMPANY, INC., OF NEW YORK, N. Y., A CORPORATION OF NEW YORK.

APPARATUS FOR SHELLING PALM NUTS.

Application filed January 12, 1922. Serial No. 528,798.

This invention relates to a nut shelling method and apparatus and more particularly to a method and apparatus for opening or shelling palm nuts or the like; and has special reference to the provision of a method and apparatus of this nature adapted for opening tough, stone-like shelled nuts such as the Babassu palm nut.

The Babassu palm nut, a species of palm nuts occurring extensively in Brazil, grows in clusters or bunches on the Babassu palm tree, the bunches which may be about 5 feet long bearing about 700 nuts and having a total weight of approximately 150 pounds. Each of the nuts, which is about the size of a large lemon, weighs about one quarter of a pound and is composed of an outer fibre shell (pericarp) and a very hard inner shell (endocarp) encasing the kernels. The inner shell is from ⅜ to ½ inch thick measured from the pericarp to the kernels and is composed of a hard, homogeneous stone-like substance interspersed with woody fibre running therethrough and running longitudinally of the nut. This endocarp or stone-like shell encases a plurality of oil bearing kernels, each of the kernels being encased by the stone walls of the endocarp, the number of kernels in a nut varying from 2 to 5, some more or less. The kernels of the Babassu nut are each about 1½ inches long and ⅜ of an inch thick and are richly laden with a useful oil, the kernels containing about 70 percent of a clear, light sweet oil used for edible and other purposes. The tough, hard and thick nut shells render the nut extremely difficult to crack, the cracking or shelling of the nut so that all the kernels are freed from their sacs or cavities where a maximum yield is desired and so that all the kernels are removed in a noncrushed or unbroken condition for the better preservation of the oils during shipment of the kernels being difficult of attainment.

Heretofore several methods of opening or shelling these nuts have been used, a common method employed consisting of the cracking of the nut by subjecting the same to heavy blows or crushing action. In the practice of such method the meat or kernels of the nut are often crushed, mashed or broken along with the shell, this being undesirable; and in the practice of this method it has been found very difficult to completely free the kernels from their enclosures or sacs so that the kernels may be removed with facility after the cracking operation. The provision of a method and apparatus in which the crushing or cracking of the shells is done away with and the crushing of the kernels obviated and in which the shell may be opened in a comparatively facile manner so that all the cavities or sacs are broken to liberate or free the kernels and thus render the subsequent removal of the same from the sacs a simple operation is a prime desideratum of my present invention.

As heretofore mentioned, the endocarp or hard interior shell is composed of a stonelike, homogeneous substance interspersed with wood-like fibres running longitudinally therethrough. These fibres render the hard shell grainy with the grain disposed longitudinally of the nut. This grain in the inner shell permits the nut to be severed and split longitudinally with comparative ease; and I have found that the nut may be severed along or with the nut grain into a plurality of longitudinal sections so that the kernels are freed from their enclosing walls in an uncrushed condition, with the kernels in condition ready to be picked or removed from their sacs; and the provision of a method and apparatus in which the nut is severed into a plurality of longitudinal sections and severed so as to free the kernels from their enclosures in the state desired, is a prime desideratum of my present invention.

As above indicated, the Babassu nut bears a number of kernels, the number ranging from 2 to 5, some more or less. In order to obtain a maximum yield of kernels during shelling of the nut I have found it desirable to sever the nuts so that all the kernel sacs may be opened in a single shelling step and the provision of a method and apparatus for accomplishing this end is another prime desideratum of my invention. Each of the kernels is housed in the shell and the kernels are spaced in the shell circumferentially of the nut and in a substantially symmetrical manner. In the practice of my method to attain the desired end the nut is severed into a plurality of substantially similar longitudinal and preferably wedge shaped sections, the nut being opened in a symmetrical manner to break through all of the kernel enclosures.

The principal objects of my present invention may be said to include, besides the provision of a method and apparatus for opening or shelling palm nuts, having the functions and advantages above enumerated, the further provision of a method and apparatus of this nature in which the longitudinal or wedge shaped sections into which the nut is divided may be split or spread apart during the severing operation so that the severing takes place for only part of the nut length, this preventing or minimizing the cutting into the kernels themselves; the further provision of such a method in which the severing and splitting of a nut takes place progressively from one end of the nut towards the other and short of such other end, the spilt sections being held together by such end after the severing and splitting or spreading steps; the further provision of an apparatus for carrying out the method, which may be operated by a native and in which shelling of the nuts may be accomplished on the field without the necessity of shipping the heavy nuts to a remote shelling station and the provision of a method and apparatus of the kind referred to which may be carried on and operated with facility for obtaining a large yield at a low operating cost.

To the accomplishment of the foregoing and such other objects as may hereinafter appear, my invention consists in the elements and their relation one to the other, as hereinafter particularly described and sought to be defined in the claim, reference being had to the accompanying drawings which show a preferred embodiment of my invention and in which:

Figure 1 is an elevational view of my apparatus showing its attachment to the trunk of a tree, Figure 2 is a view of a detail taken in cross section on the line 2—2, Figure 1, Figure 3 is a front elevational view of the apparatus, Figure 4 is a top plan view thereof, Figure 5 is an enlarged fragmentary view of parts of the apparatus and showing the manner in which a nut is shelled or opened, Figure 6 is a view of the Babassu nut, Figure 7 is a view thereof taken in cross section on the line 7—7, Figure 6, Figure 8 is a perspective view of the nut when opened in accordance with my invention, Figure 9 is a perspective view of the cutting member employed, and Figures 10 and 11 are plan views of two forms of cutting members.

Referring first to Figures 6 and 7 of the drawings, the Babassu nut having the configuration or appearance shown in Figure 6 is shown composed of an outer shell or pericarp $p$, which may be about $\frac{1}{16}$ of an inch thick and an inner shell (endocarp) $n$, the said inner shell being substantially about $\frac{1}{2}$-inch thick, and an intermediate layer $l$ separating the pericarp from the endocarp, the said layer being of relatively soft substance and simulating cork in appearance. Encased in the inner shell $n$ are a plurality of kernals $k$ disposed longitudinally of the nut and spaced circumferentially thereof in somewhat of a symmetrical condition, as clearly shown in Figure 7 of the drawings, Figure 7 showing the nut as having three kernels. Each of the kernels $k$ is substantially completely housed by the inner shell $n$. As the nuts ripen the kernels shrink away from the walls of their sacs, this being shown particularly in Figure 7 of the drawings. The inner shell $n$ is composed, as heretofore mentioned, of a hard, stone-like substance interspersed with woody fibres $f$ running therethrough and longitudinally of the nut.

As heretofore pointed out, a prime desideratum of my invention comprehends a method and an apparatus in which the Babassu nut may be broken or opened without subjecting the kernels $k$ to crushing action, my invention comprehending a method in which the inner shell may be broken with comparative ease. To this end the nut is severed along longitudinal planes with the nut separated or divided into a plurality of longitudinal sections, the nut being severed along or with the longitudinal grain thereof. To free the kernels from their sacs I have found it desirable to so sever the nut as to cut through the walls of the sacs, the kernels being then free to be picked or removed after the nut is divided into its longitudinal sections. To this end my present invention comprehends the severing of the nut along longitudinal planes and preferably along planes radiating from the axis of the nut with the planes intersecting the walls of the sacs or cavities of the kernels. This is shown in Figure 7, for example, and referring to this figure my invention contemplates the severing of the nut along planes such as planes $a$, $b$, $c$, $d$ and $e$, a number of planes preferably greater than the number of kernels being provided so that all the kernel sacs may be broken irrespective of the position of a nut with respect to the cutting member. In this manner the nut is severed into a plurality of substantially wedge shaped sections with the nut so severed as to break not only the hard and tough inner shell, but to break the same to free substantially all the kernels from the nut. To accomplish these desired ends, I provide a cutting member 15 provided with a plurality of blades or knives such as 16, 17, 18, 19 and 20, the said knives being arranged in planes running longitudinally of the cutting member and preferably in planes radiating from a common axis. In the practice of the method the Babassu nut is disposed or positioned relative to the cutting member 15 so that the axis of the nut is substantially in alinement with the common axis of the cutting member, as shown particularly in Figure 1 of the drawings, and with the nut so positioned the cutting member and nut are forced one into the other to effect the desired severing of the nut into the wedge shaped sections, as shown particularly in Figure 5 of the drawings. In the practice of this method I have found that the nut may be opened with a considerable degree of facility and that the nut enclosures or sacs may be broken in an efficient manner to relieve or free all of the kernels from the shell, with the kernels in a condition ready to be picked or otherwise removed from the shell.

For the purpose of preventing injury or damage to the kernels themselves, I have found it desirable to cut or sever the nut in such a manner as to prevent the cutting into the kernels by the cutting member. To this end the nut is severed along longitudinal planes preferably for a length less than the full length of the nut and the severed sections are progressively spread apart so that substantially the remaining portions of the nut may be split apart. This spreading of the sections of the nut also facilitates subsequent removal of the kernels. To this end each of the blades or knives 16 to 20 of the cutting member 15 comprises a wedge shaped element as clearly shown in the drawings, and in the practice of the method each of the knives simultaneously cuts the nut into its sections and spreads the said sections apart. I prefer to practice the combined cutting and spreading step so that the sections are split apart for a length of the nut less than the full length of the nut with all the sections held together at one end of the same, the nut so treated having the configuration as shown, for example, in Figure 8 of the drawings. Referring to this figure, the nut is shown divided into a plurality of substantially wedge shaped sections 21, 22, 23, 24 and 25, with kernels $k$ exposed in their cavities in the inner shell $n$, all of the wedge shaped sections being held together at the unbroken or uncut end of the nut 26.

Although it is preferred to provide a cutting member having about five blades or knives, as shown particularly in Figures 9 and 10 of the drawings, this to the end of providing means for cutting through all of the kernel sacs, my invention contemplates a variation in the number of knives or blades used such as a cutting member of the construction shown in Figure 11 in which a less number of cutting blades such as 27, 28 and 29 are used. It is preferred to increase the number of cutting blades to increase the kernel yield in the shelling operation.

For the purpose of seating the nut on the cutting member and for the purpose of effecting a deeper cut in the exterior portions of the shell, this further minimizing the cutting into the kernels themselves, the knives or blades 16 to 20 are fashioned to provide the concave cutting edges 16', 17', 18', 19' and 20', the concavity of these parts being so predetermined as to provide a pocketed seat for the nut to accommodate the end portion of the same, as shown, for example, in Figure 1 of the drawings.

Referring now more particularly to the apparatus utilized for practicing the method, and referring more particularly to Figures 1 to 5 of the drawings, I provide a frame or structure 30 having preferably a front foot 31 and an integral boss 32, these parts being provided with a bore receiving the shank portion 33 of the cutting member 15, the said cutting member being removably inserted in the bore and held in position as by means of the bolt 34. Formed preferably integrally with the frame structure 30 I provide the guide sleeve 35 and slidably mounted in this guide I provide the hammer or plunger 36, the said hammer or plunger being arranged to be movable to and from the cutting member 15 for the breaking or opening of a nut N located therebetween. As heretofore pointed out, the knife edges of the cutting member are suitably contoured to provide a seat for the bottom of the nut N and for the purpose of providing a seat for the top of the nut, the hammer or plunger 36 is suitably recessed as at 37, to fit the upper end configuration of the nut N, as particularly shown in Figures 1 and 5 of the drawings. In the operation of these parts the nut N is seated on the cutting member 15 with the axis of the nut substantially in alinement with the axis of the cutting member and the plunger or hammer 36 is moved downwardly with the upper end of the nut seated in the recess 37, the nut being forced into the cutting member in the downward movement of the plunger 36. The parts are, furthermore, so relatively arranged that the plunger preferably moves down a predetermined distance, as shown in Figure 3 of the drawings, to effect the cutting of the nut into its sections for a portion only of the length of the nut and to effect the splitting of the nut by the wedge shaped knives for a length short of the full length of the nut for the purposes heretofore recited. With large sized nuts, however, the plunger need not be forced to its fully descended position.

In the present embodiment of my apparatus the nuts N are preferably fed by hand, although my invention contemplates the feeding of the nuts automatically and in the present exemplification of my invention I prefer to operate the hammer or plunger 36 by hand adapting the apparatus to the individual use of a native. Although the mechanism for operating the plunger may be varied within wide limits, I prefer to provide the apparatus shown in the drawings, it having been found that this apparatus provides the necessary power for opening the nuts to be operated with facility by hand, this apparatus comprising preferably a toggle link mechanism with means for actuating the same. Referring to Figures 1 to 3 of the drawings, I show the toggle links 38 and 39 connected together at one end in a manner as will be described presently, the other end of the toggle link 39 being pivotally connected to the upstanding ears 40 of the plunger 36, the other end of the toggle link 38 being pivotally connected to the side plates 41 attached to a projecting head 42 preferably forming part of the frame structure 30, the said plates 41 being attached to the head as by means of the bolts 43. Connected to the adjacent and attached ends of the toggle links 38 and 39 I provide the connecting link 44, these links being connected together in a manner as shown particularly in Figure 2 of the drawings to permit of the desired strength and rigidity of the parts. Referring to Figure 2, I show each of the links such as 38 and 44 laterally grooved as at 45 and 46 respectively for receiving the flanges of the flanged side disks 47 and 48, the said disks attaching the links together and permitting the necessary relative movements thereof, all the parts being secured together as by means of the threaded bolt 49 and the nut 50, a washer 51 being interposed between the flanged disk 48 and the nut and a pin 52 being provided for preventing endwise movement of the nut. For the purpose of providing a suitable bearing for the ends of all the links, I also preferably provide the drum or sleeve 53 between the flanged disks 47 and 48, the ends of the links being suitably contoured to bear upon the said sleeve.

For the purpose of operating the links I provide the handle or arm 54 adjustably mounted in a block 55 and held in any adjusted position to suit the needs of the operator as by means of the bolt 56, the block being fixed on a shaft 57 journalled in opposed bearings 58 and 59 provided in the side plate portions 60 and 61 of the frame 30. Connecting the link 44 and the shaft 57 I provide the spaced arms 62 and 63, the said arms being pivotally connected to the link 44 as particularly shown in Figure 4 of the drawings, the said arms being keyed to the shaft 57. For the purpose of normally supporting the plunger in its ascended position and for the purpose of returning the same to such position when the toggle is broken, I preferably provide the spring returning element 64 anchored at one of its ends to the frame 30 by means of the securing means 65 and anchored to the block 55 as at 66.

For the purpose of utilizing my apparatus on the field at or near the nut growing region, I preferably construct the same so as to be suitably supported on the trunk of a tree or like support and to this end I provide means whereby the apparatus may be strapped in position on a tree trunk. To accomplish this the frame 30 is provided adjacent its upper end with opposed arm portions 67 and 68 made preferably integrally with the frame structure 30, the said arm portions being provided with teeth 69 intended for taking into the trunk of a tree 70, the means for strapping the apparatus to the tree comprising the integral hooked finger 71 of the arm 67, the said hooked finger being adapted to receive the end link of the chain 72, the other end link of the chain being received by the hooked bolt 73 adjustably mounted in the ear 74, the latter formed preferably integrally with the arm 68 an adjusting nut 75 being provided for increasing the tension on the chain 72 and adapting the apparatus to trunks of various diameters. For suitably positioning the bottom of the apparatus I provide the opposed toes 76 and 77 formed preferably integrally with the bottom portion of the frame 30, the said toes being contoured to embrace the lower part of the tree trunk.

The practice of my method and the use and operation of my apparatus will, in the main, be apparent from the above detailed description thereof. When the nuts are fed by hand they are positioned on the cutting member 15 by the native and the operating arm or handle 54 is forced down to effect the closing of the toggle links 38 and 39 for forcing the descent of the plunger 36, this effecting the forcing of the nut N and the cutting member 15 one into the other for the severing of the nut along longitudinal planes and preferably along planes radiating from the axis of the nut, the opening of the nut starting from one end of the same and progressing towards the other end. The nut is severed into a plurality of wedge shaped sections such that all the kernel sacs or enclosures are broken, with the nuts exposed and freed therefrom. The cutting of the nut takes place through a portion of the nut less than the full length thereof, the severed sections being simultaneously and progressively spread apart to effect a splitting of the sections for a length to expose substantially the full length of the kernels of the nut. The severing and spreading operation is carried on for substantially the full length of the nut but falling short of one end so that all the sections are retained in a cluster. This facilitates the subsequent handling of the nut and permits the kernals being shaken from the nut in a simple manner when the kernels are loose therein.

It will be apparent from the foregoing that I have provided a relatively simple apparatus utilizable in the practice of a method in which the tough, hard nut shell of the Babassu nut may be broken without mashing or crushing the kernels of the nut, a higher grade kernel being thereby obtained; and it will be further apparent that with my method a maximum yield of kernels may be obtained not only, but that the kernels may be so conditioned in the nut opening step as to render the same easily removable as by shaking the nut or picking the kernels therefrom in the subsequent operation.

While I have shown my device in the preferred form, it will be obvious that many changes and modifications may be made in the structure disclosed without departing from the spirit of the invention, defined in the following claim.

I claim:

An apparatus for shelling palm nuts or the like, comprising a cutting member including a plurality of knives arranged about a common axis, the cutting edges of the knives being contoured and the knives relatively arranged to provide a pocketed seat for accommodating the end portion of a palm nut so that the palm nut may be positioned relatively to the knives with the axis of the former substantially aligned with the common axis of the latter, a plunger of substantially cylindrical shape having an end thereof recessed to provide means for seating the other end of the nut, and means to relatively move the cutting member and plunger, the said knives being wedge shaped so as to effect a combined severing of the nut into sections and a spreading apart of such section.

Signed at Gloucester City in the county of Camden and State of New Jersey this 27th day of December, A. D. 1921.

ROBERT B. JOHNSTON.